United States Patent Office 2,894,056
Patented July 7, 1959

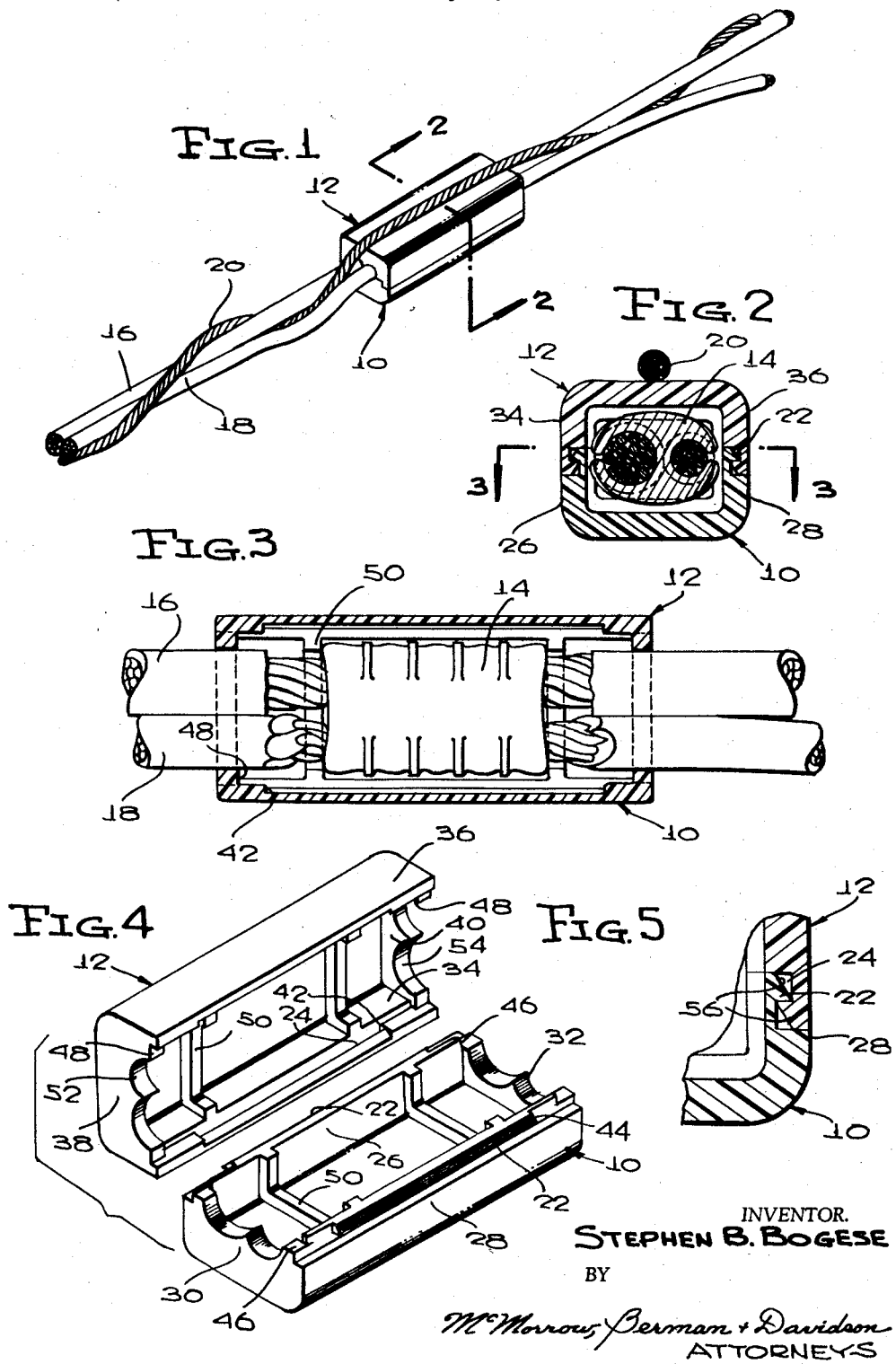

2,894,056

PROTECTIVE SHEATH FOR A CABLE CONNECTOR

Stephen B. Bogese, Roanoke, Va., assignor to Virginia Plastics and Chemical Company, Inc., Roanoke, Va., a corporation of Virginia Application May 28, 1957, Serial No. 662,257

1 Claim. (Cl. 174—92)

The present invention relates to a protective sheath for a cable connector.

An object of the present invention is to provide a sheath for a cable connector which lends itself to ready attachment of two or more cables, and protects the connector from the weather and inadvertent contact with adjacent objects.

Another object of the present invention is to provide a sheath for a cable connector which lends itself to one-hand operation while being attached to a cable connector and the adjacent parts of two or more cables.

A further object of the present invention is to provide a sheath for a cable connector which may be used to permanently encase a cable connector and the exposed portions of two or more cables and to insulate the same electrically from an entwined support cable.

A still further object of the present invention is to provide a sheath for a cable connector which has internally disposed locking means for permanently securing it to a cable connector, one which has no external projections which might be subject to breakage or provide means for opening the sheath, one which obviates the use of attaching clips or bolts, and one which presents a smooth outer surface when assembled about a cable connector substantially free of dirt or moisture catching crevices or cracks.

Yet another object of the present invention is to provide a protective sheath for a cable connector which is sturdy in construction, one simple in structure and readily fabricated of dielectric plastic materials by molding processes, one which is economically feasible, and one which is highly effective in action.

These and other objects and advantages of the present invention will be fully apparent from the following description when taken in connection with the annexed drawings, in which:

Figure 1 is an isometric view of a pair of electrical cables, a trunk line cable and a branch cable, with a support cable entwined therearound in the conventional manner, with the protective sheath according to the present invention attached to the electric cables.

Figure 2 is a sectional view, on an enlarged scale, taken on the line 2—2 of Figure 1, Figure 3 is a sectional view, taken on the line 3—3 of Figure 2, Figure 4 is an exploded isometric view showing the two sections of the protective sheath according to the present invention, and Figure 5 is a fragmentary sectional view showing the interlocking tongue and groove constituting the cooperating fastening means used to hold the two sections of the sheath together.

Referring in greater detail to the drawings in which like numerals indicate like parts throughout the several views, the protective sheath according to the present invention comprises two half sections 10 and 12 which when assembled together are conformably shaped to encase and completely house a connector 14. The connector 14 is of conventional construction and fabricated of a malleable metal which is crimped about the exposed portions of a pair or more of cables, such as trunk line cable 16 and a branch cable 18, as shown in Figures 1 to 3, inclusive. In Figures 1 and 2 a support cable 20 is shown entwined about the cables 16 and 18 for support of the latter between a pair of spaced utility poles or a utility pole and a building in which the electric current from the branch cable 18 is to be used.

Each of the half sections 10 and 12 of the protective sheath of the present invention are preferably fabricated of a dielectric material, plastic or the like, readily molded into the desired form.

When the sections 10 and 12 are assembled about the connector 14, the sections 10 and 12 are arranged in confronting face-to-face abutting relation. Cooperating fastening means are provided on the confronting faces of the sections 10 and 12 for securing and locking the sections 10 and 12 together. These means embody, as shown most clearly in Figure 5, opposed tongues 22 interengaging complemental grooves 24 formed on the confronting face of the section 12.

The tongues 22 extend along the upper end of each of the side walls 26 and 28 of the section 10 from a point spaced inwardly of one end wall 30 to a point spaced inwardly of the other end wall 32. The grooves 24 extend along the lower end of each of the side walls 34 and 36 of the section 12 from a point spaced inwardly of one end wall 38 to a point spaced inwardly of the other end wall 40.

Cooperating stop means are provided on the confronting faces of the sections 10 and 12 for preventing longitudinal movement of the sections 10 and 12 relative to each other. Specifically, these stop means embody an abutment 42, seen in Figure 4, positioned adjacent each end of each of the grooves 24 and engaging the adjacent end of the complemental one of the tongues 22, one of such tongue ends being shown in Figure 4 and designated by the reference numeral 44.

The section 10 is provided on its confronting face with a notch 46 extending inwardly from each end of each of the side walls 26 and 28, as shown in Figure 4. The section 12 has a shoulder member 48 projecting from its confronting face inwardly of each end of each of the side walls 34 and 36 and interengaging, when the sections 10 and 12 are assembled together, the adjacent notch 46 of the section 10 and preventing longitudinal movement of the sections 10 and 12 relative to each other.

Other stop means are provided on each of the sections 10 and 12 engageable with the ends of the connector 14 when the sheath of the present invention, embodying the sections 10 and 12, encase and completely houses the connector 14. These other stop means are shown in Figures 3 and 4 and embody U-shaped formations 50 projecting from the inner walls of each of the sections 10 and 12 at positions inwardly of the end walls 30, 32, and 38, 40 respectively, so as to engage the ends of the connector 14 as shown in Figure 3.

The end wall 30 of the section 10 and the end wall 38 of the section 12 are provided with arcuately curved notches, as at 52, which form, when the sections 10 and 12 are assembled together, apertures for receiving therein the adjacent portions of the cables 16 and 18. The end walls 32 of the section 10 and 40 of the section 12 are similarly provided with arcuately curved notches 54 forming apertures for the receipt therein of the other adjacent portions of the cables 16 and 18.

The protective sheath according to the present invention is preferably fabricated wholly of dielectric material somewhat flexible along its side walls 26 and 28 of the section 10 and side walls 34 and 36 of the section 12. This permits the section 12 to be assembled on the section 10 in a one-hand operation squeezing the sections together to a position in which the tongues 22 enter the complemental grooves 24, as shown in Figure 5. While the faces, as at 56 in Figure 5, of the mating parts of the sections 10 and 12 are shown as cut on an angle, such faces may be arcuately curved or otherwise shaped as desired.

The interengagement of each end 44 of the tongues 22 with the abutment 42 formed on the end of each of the grooves 24 prevents longitudinal movement of the sections 10 and 12 relative to each other. Also, the engagement of each shoulder member 48 in the complemental notch 46 further restrains longitudinal movement of the sections 10 and 12 relative to each other. The U-shaped formations 50, engaging the ends of the connector 14 prevent longitudinal movement of the sheath of the present invention upon the assembled and connected cables 16 and 18 and the connector 14 and securely hold the connector 14 against movement within such sheath.

While the sheath of the present invention is shown to have imperforate side and end walls and opposed tops and bottoms, the walls, and tops and bottoms may be perforated if it is desired to ventilate the sheath or permit the escape of any water which might be entrapped therein.

While only a single embodiment of the present invention has been shown and described, other embodiments are contemplated and numerous changes and modifications may be made therein without departing from the spirit of the invention as set forth in the appended claim.

I claim:

The combination with a trunk line cable of relatively large cross section and having a portion of the core exposed, a branch cable of smaller cross section in contact with said line cable and having a portion of the core exposed, said cables being juxtaposed with the exposed portions of the cores in alignment with each other, and a connector extending about and embracing the two aforesaid exposed sections and electrically connecting said portions together, of a protective sheath encasing and completely housing said connector, said sheath embodying a pair of half sections each fabricated of dielectric material, each section having opposed end walls provided with a pair of arcuately curved notches and receiving therein the adjacent portions of said trunk and branch cables, a pair of spaced U-shaped formations positioned within each section intermediate the ends thereof and extending transversely across the inner surface of each section, the formations of each section being engaged by the ends of said connector, and cooperating tongues and grooves on the facing portions of said sections for securing the sections together.

References Cited in the file of this patent

UNITED STATES PATENTS

| | | |
|---|---|---|
| 420,171 | Seely | Jan. 28, 1890 |
| 1,148,498 | Burton | Aug. 3, 1915 |
| 1,620,693 | Royal | Mar. 15, 1927 |
| 2,699,960 | Callery et al. | Jan. 18, 1955 |
| 2,720,332 | Holt | Oct. 11, 1955 |

FOREIGN PATENTS

| | | |
|---|---|---|
| 117,776 | Austria | May 26, 1930 |
| 402,839 | Great Britain | Dec. 11, 1933 |